US011729053B1

(12) United States Patent
Gupta et al.

(10) Patent No.: US 11,729,053 B1
(45) Date of Patent: Aug. 15, 2023

(54) DYNAMIC APPLICATION CONFIGURATION TECHNIQUES

(71) Applicant: Appian Corporation, McLean, VA (US)

(72) Inventors: Suvajit Gupta, McLean, VA (US); John Rogers, McLean, VA (US); Fred Briden, McLean, VA (US); Susumu Noda, McLean, VA (US); Jonathon Blonchek, Tysons Corner, VA (US)

(73) Assignee: Appian Corporation, McLean, VA (US)

( * ) Notice: Subject to any disclaimer, the term of this patent is extended or adjusted under 35 U.S.C. 154(b) by 0 days.

(21) Appl. No.: 17/856,133

(22) Filed: Jul. 1, 2022

Related U.S. Application Data

(63) Continuation of application No. 16/538,352, filed on Aug. 12, 2019, now Pat. No. 11,381,449, which is a continuation of application No. 15/591,537, filed on May 10, 2017, now Pat. No. 10,382,262.

(51) Int. Cl.
*G06F 15/173* (2006.01)
*H04L 41/0813* (2022.01)
*H04L 69/329* (2022.01)
*G06F 8/71* (2018.01)

(52) U.S. Cl.
CPC ............ *H04L 41/0813* (2013.01); *G06F 8/71* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 7,143,153 B1 | 11/2006 | Black et al. | |
| 7,188,163 B2 | 3/2007 | Srinivasan et al. | |
| 7,464,297 B2 | 12/2008 | Potter, IV et al. | |
| 7,761,794 B1 | 7/2010 | Chari et al. | |
| 8,352,608 B1 | 1/2013 | Keagy et al. | |
| 8,898,624 B2 | 11/2014 | Bouillet et al. | |
| 9,612,824 B2 * | 4/2017 | Hsieh | G06F 8/71 |
| 10,382,262 B1 | 8/2019 | Gupta et al. | |
| 10,764,133 B2 * | 9/2020 | Ganesan | H04L 41/0816 |
| 10,778,518 B2 * | 9/2020 | Ganesan | G06F 9/50 |
| 10,860,313 B2 * | 12/2020 | Monet | G06F 8/65 |

(Continued)

*Primary Examiner* — Phuoc H Nguyen
(74) *Attorney, Agent, or Firm* — Fish & Richardson P.C.

(57) ABSTRACT

In some implementations, a system enables users to create dynamically configurable applications that can be dynamically configured and adjusted. An application that runs on the server system in a first configuration is configured using a first configuration template. Data indicating (i) that the application is being accessed on a computing device in the first configuration, and (ii) a request to adjust the first configuration of the application is received. Operations are then performed while the application is being accessed on the computing device in the first configuration. A second configuration template that specifies a second configuration of the application corresponding to the request included in the received data is generated. The application is adjusted using the second configuration template to run in the second configuration. An instruction is provided to the computing device to enable the computing device to access the application running in the second configuration.

20 Claims, 10 Drawing Sheets

(56) References Cited

U.S. PATENT DOCUMENTS

| | | |
|---|---|---|
| 11,381,449 B1 | 7/2022 | Gupta et al. |
| 2002/0001307 A1 | 1/2002 | Nguyen et al. |
| 2004/0006546 A1 | 1/2004 | Wedlake et al. |
| 2004/0260408 A1 | 12/2004 | Scott et al. |
| 2007/0136324 A1 | 6/2007 | Xu et al. |
| 2008/0104215 A1 | 5/2008 | Excoffier et al. |
| 2013/0103836 A1 | 4/2013 | Baniqued et al. |
| 2013/0304889 A1 | 11/2013 | Johnsen et al. |
| 2014/0100676 A1 | 4/2014 | Scott et al. |
| 2014/0156816 A1 | 6/2014 | Lopez Da Silva et al. |
| 2015/0172111 A1 | 6/2015 | Lalsangi et al. |
| 2016/0036638 A1 | 2/2016 | Campbell et al. |
| 2016/0112252 A1* | 4/2016 | Notari ................ H04L 41/0843 709/221 |

* cited by examiner

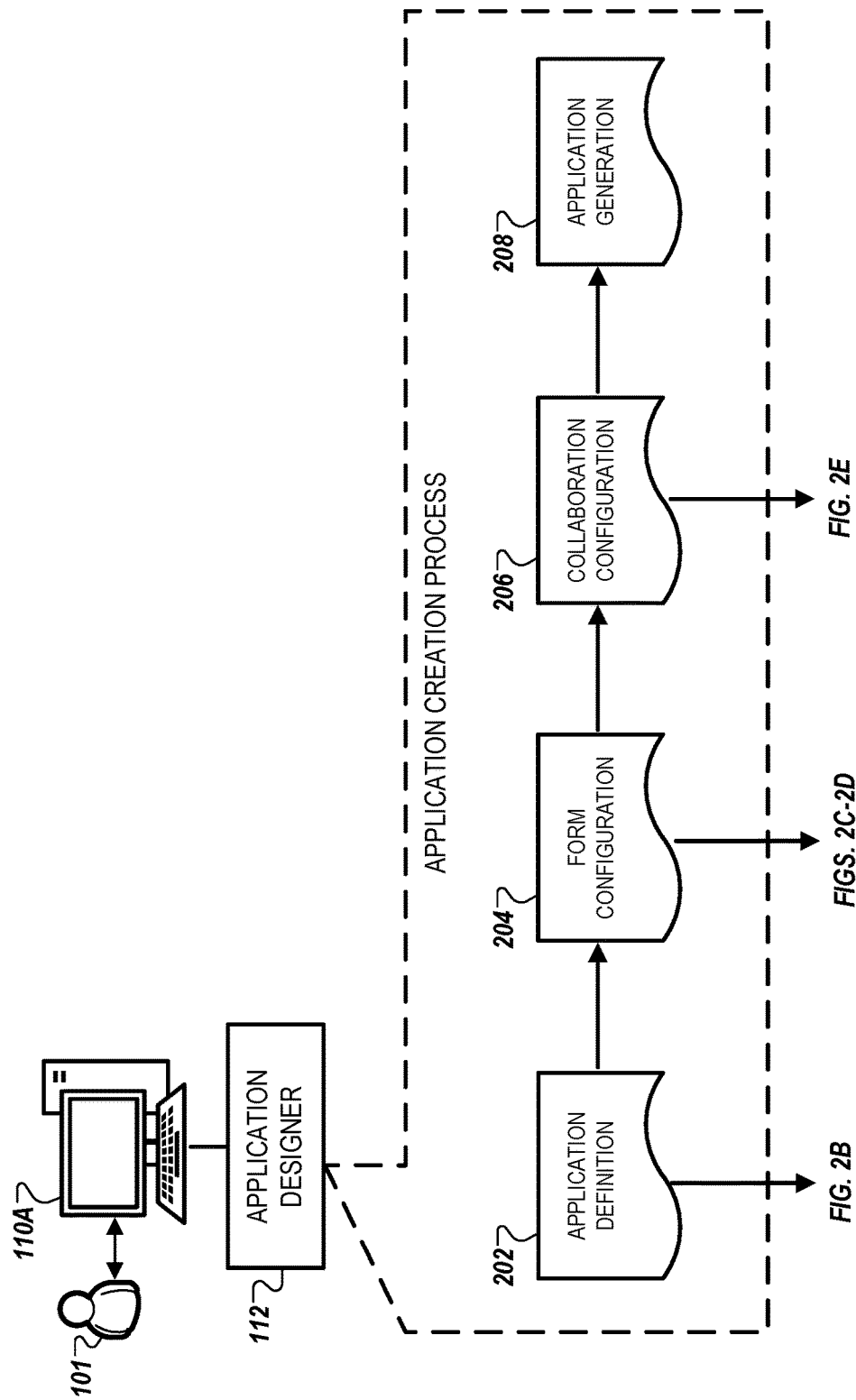

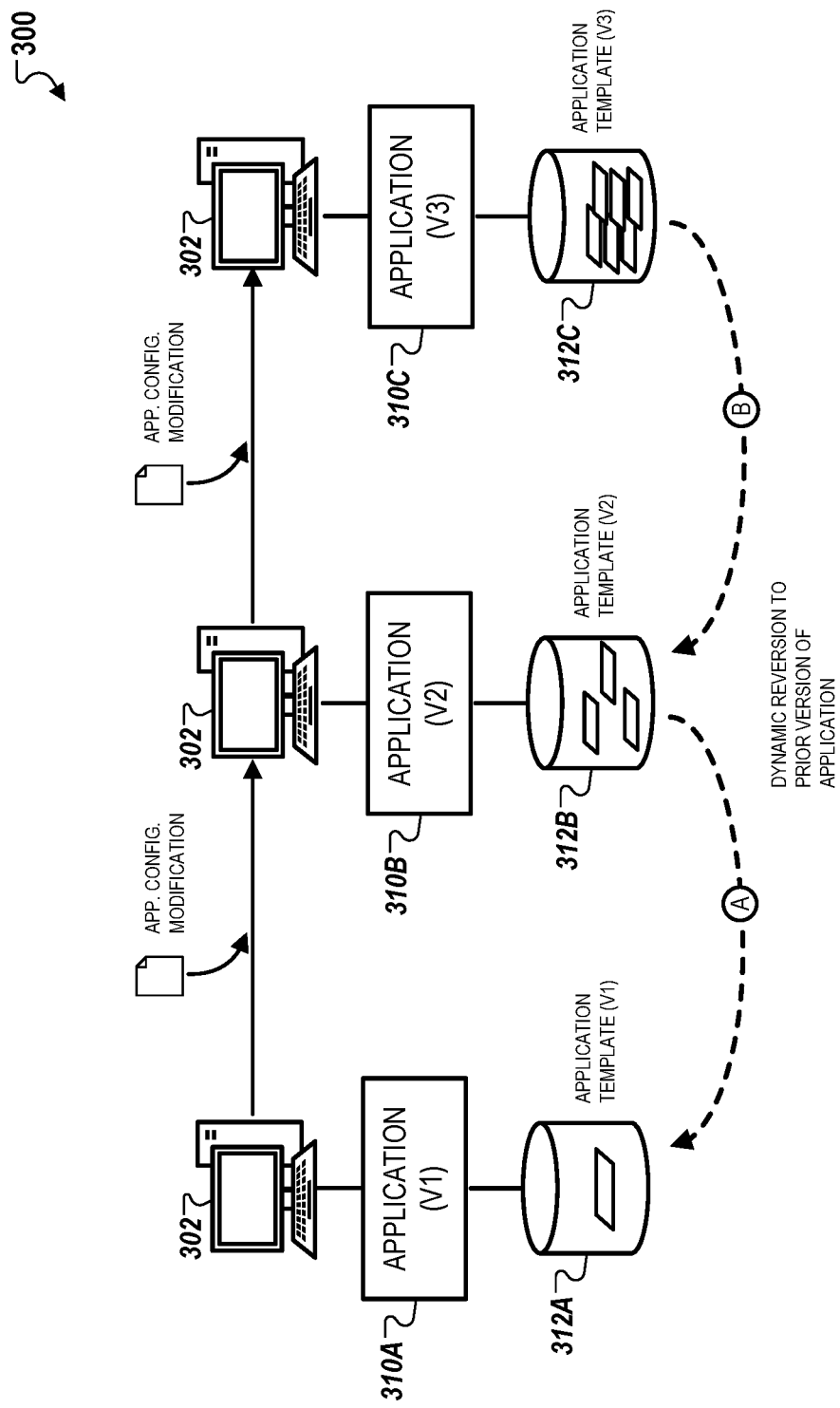

DYNAMIC APPLICATION CONFIGURATION TECHNIQUES

CROSS-REFERENCE TO RELATED APPLICATIONS

This application is a continuation of U.S. application Ser. No. 16/538,352, filed Aug. 12, 2019, now allowed, which is a continuation of U.S. application Ser. No. 15/591,537, filed May 10, 2017, now U.S. Pat. No. 10,382,262, issued Aug. 13, 2019. The disclosure of each of the foregoing applications is incorporated herein by reference.

TECHNICAL FIELD

This specification generally relates to application software.

BACKGROUND

Application software for electronic devices can provide useful functionality to users. Application programs, for example, can be designed to perform coordinated functions, tasks, or activities specified by a user or a collection of users. Applications are often associated with an application server within a software framework. For example, web-based mobile applications often display electronic content that is obtained from a web server that stores the electronic content. In this example, the server operates similar to an extended virtual machine for running applications, handling connections to database, and connections to a web client. In other examples, an application provides services that are made available by the application server using computer hardware on which the services run.

SUMMARY

Applications that are deployed in business environments are often designed, configured and implemented by individuals with technical expertise (e.g., software developers, information technology (IT) administrators). Some applications that are configured to be designed by non-technical users (e.g., business end-users) either provide a limited set of customization features, or provide customization features that can potentially create system-wide vulnerabilities. For example, if an application is incorrectly designed and/or implemented, then its execution in a production environment can potentially cause performance-related issues (e.g., inefficient resource allocation, breaking or removing critical application dependencies). Many systems often reduce the impact of such vulnerabilities by limiting the privileges of end-users and/or limiting the functioning the functional capabilities for applications that are designed and/or customized by end-users.

In addition, systems that allow non-technical users to create applications often have residual applications that were created by users at some point but are no longer used but remain configured. These residual applications are difficult to remove and can potentially affect the performance of the system when running other actively running applications. These applications often continue to consume system resources, can potentially complicate data dependencies and object definitions, and if left unaddressed, can cause long-term performance deterioration.

In some implementations, a system enables users to create dynamically configurable applications that can be dynamically configured and adjusted. For example, the system enables users with limited technical expertise to design the customized applications to support a wide variety of business processes (e.g., records management, project collaborations, etc.). In addition, the system enables users to dynamically adjust the configuration of an application to ensure that it is flexible and adaptive in different usage scenarios. For example, a user can adjust an existing configuration of an application that has already been deployed in a production environment without having to reconstruct the entire application. In this regard, the system enables users to adjust the configuration of an application while it is in use in a production environment.

The techniques of the system may provide one or more of the following technical advantages. Other advantages are discussed throughout the detailed description. The present technology allows updates to an application in real-time while the application is actively being used by an end-user. To accomplish this, the system uses application templates that adjust an application according to a specified configuration that corresponds to a user-submitted change. The application templates are implemented by a server system that runs the application as the end-user accesses the application through a client device. During the reconfiguration process, the server system is capable of adjusting the application without necessitating that the client device terminates an active instance of the application. In this regard, the server system is capable of adjusting the configuration of an application without substantially affecting the user's experience on the application, as described in detail below.

In addition, the system generates and constructs the applications in a self-contained manner to enable reversion to the most recent version of application once a set of adjustments have been implemented. To accomplish this, the system packages all content for the application (e.g., configuration files, executable instructions, etc.) in an application container that is stored on the server. The server stores version-specific configuration data, enabling the user to revert to the most recent prior version after an adjustment has been implemented.

The system further includes protection frameworks to prevent users from configuring and/or adjusting applications that can potentially reduce existing system and application functionalities and/or reduce performance because of implementing the configuration and/or adjustment. For example, the system can include an audit module that performs automatically evaluation tests on each new configuration to ensure that any adjustment made by the end-user is not logically incomplete to cause an execution error. In this example, the system prevents an end-user from implementing an adjustment to the configuration of the application if the adjustment causes an execution. In another example, the audit module performs evaluation tests to determine if the adjustment involves application components were adjusted using altered versions of components that were changed outside of a predetermined content library. In this example, the system disallows the end-user from making any further adjustments to the application.

When generating a new application and adjusting a configuration of an application, the system can use a set of predetermined application generation protocols to automatically select the appropriate data schema, application files, components, and other types of content to construct the application based on a set of user-defined criteria. The set of predetermined application generation protocols can include a specific application generation protocol that is selected as a best-practice protocol for each data type for data fields that can be included on the application. In this regard, the system identifies data types for data fields configured or adjusted by the user, and in response, selects the appropriate best-practice protocols to construct the application without requiring the user to manually specify the application generation protocols.

In one aspect, a computer-implemented method can include: configuring, by a server system using a first configuration template, an application that runs on the server system in a first configuration specified by the first configuration template; receiving, by the server system and from the computing device, data indicating (i) that the application is being accessed on the computing device in the first configuration, and (ii) a request to adjust the first configuration of the application; and performing operations while the application is being accessed on the computing device in the first configuration. The operations can include: generating, by the server system, a second configuration template that specifies a second configuration of the application corresponding to the request included in the received data, adjusting, by the server system using the second configuration template, the application to run in the second configuration, and after adjusting the application to run in the second configuration, providing, by the server system and to the computing device, an instruction that enables the computing device to access the application running in the second configuration.

One or more implementations can include the following optional features. For example, in some implementations, the method further includes storing, by the server system, backup data associated with the first configuration for the application.

In some implementations, the method further includes: after the server system has adjusted the application to run in the second configuration, determining, by the server system, to revert the application to the first configuration; generating, by the server system, the first configuration template based at least on the backup data associated with the first configuration for the application; and adjusting, by the server system and using the first configuration template, the application to run in the first configuration.

In some implementations, the data indicating the request to adjust the first configuration of the application includes a data type adjustment for a data field of the application. In such implementations, generating the second configuration template includes: identifying, by the server system, one or more database objects that are determined to have data dependencies to the data field of the application, and adjusting, by the server system, a configuration of the one or more database objects according to the request to adjust the first configuration of the application.

In some implementations, the method further includes operations that are performed before adjusting the application to run in the second configuration. The operations can include: executing, by the server system, one or more evaluation tests associated with the second configuration template; and determining to adjust the application based on results of the one or more evaluation tests.

In some implementations, the results of the one or more evaluation tests indicate that adjusting the application using the second configuration template will not cause one or more execution error.

In some implementations, the results of the one or more evaluation tests indicate that the request to adjust the first configuration of the application is not associated with one or more modified application components.

In some implementations, the instructions of the second configuration template causes the server system to remove content associated with the first configuration template.

In some implementations, generating the second configuration template includes: determining a data model for the second configuration template corresponding to the received request to adjust the first configuration of the application; obtaining data indicating a plurality of verified application generation protocols that are each associated with a different data field included within the data model; identifying one or more data fields of the application to be adjusted based on the received request to adjust the first configuration of the application; and selecting, from among the plurality of verified application generation protocols, one or more verified application generation protocols that are associated with to the one or more identified data fields for the application to be adjusted.

In some implementations, adjusting the application to run in the second configuration includes adjusting the application using the one or more selected verified application generation protocols.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 2A is a block diagram that illustrates an example of a process for creating a dynamically configurable application.

FIGS. 2B-2E are diagrams that illustrate examples of user interfaces for creating a dynamically configurable application.

FIG. 3 is a block diagram that illustrates an example of a system that is capable of reverting the configuration of an application to a prior configuration.

In the drawings, like reference numbers represent corresponding parts throughout.

DETAILED DESCRIPTION

Figure 1A:
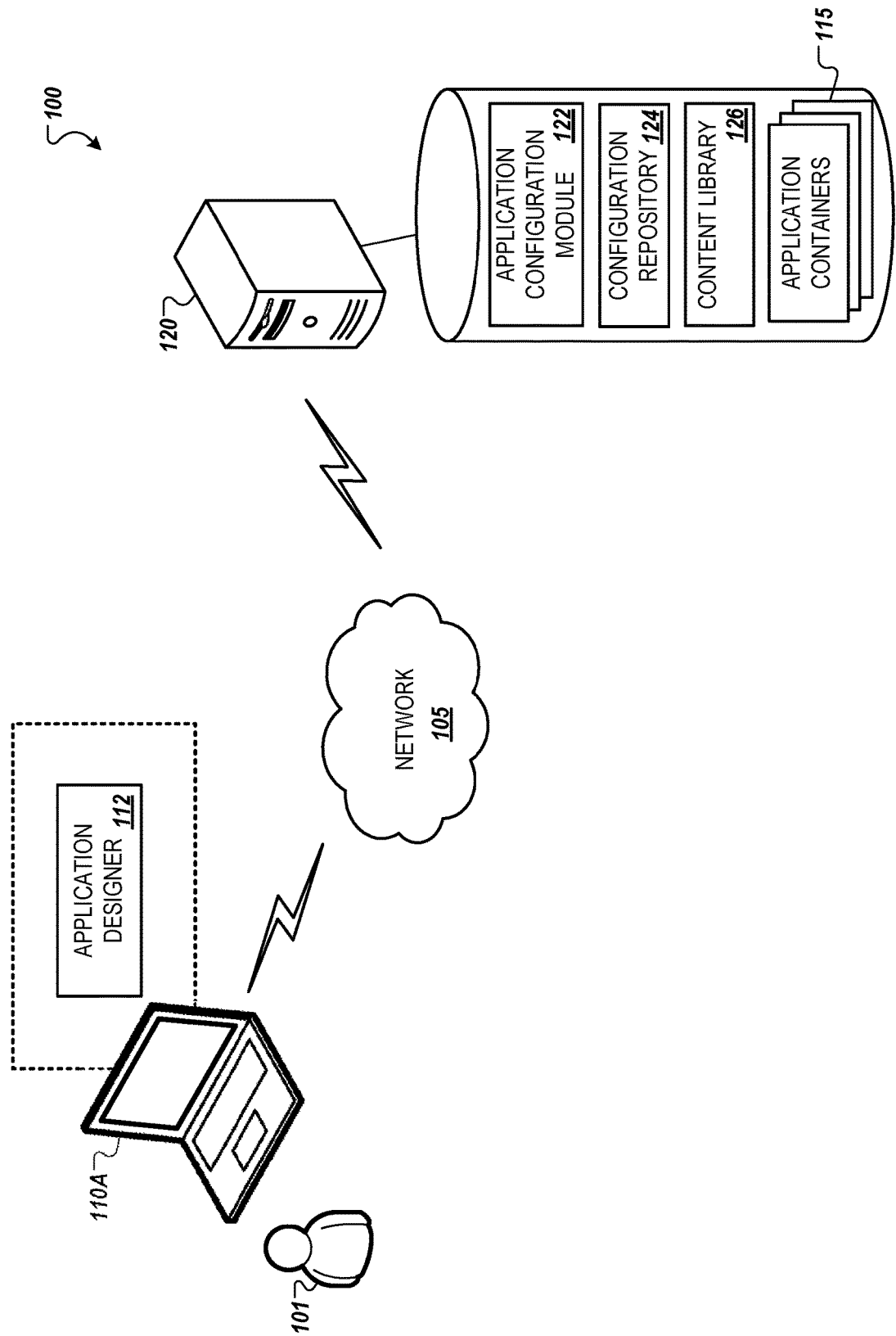
FIG. 1A is a block diagram that illustrates an example of a system that is capable of generating dynamically configurable applications.
Figure 1B:
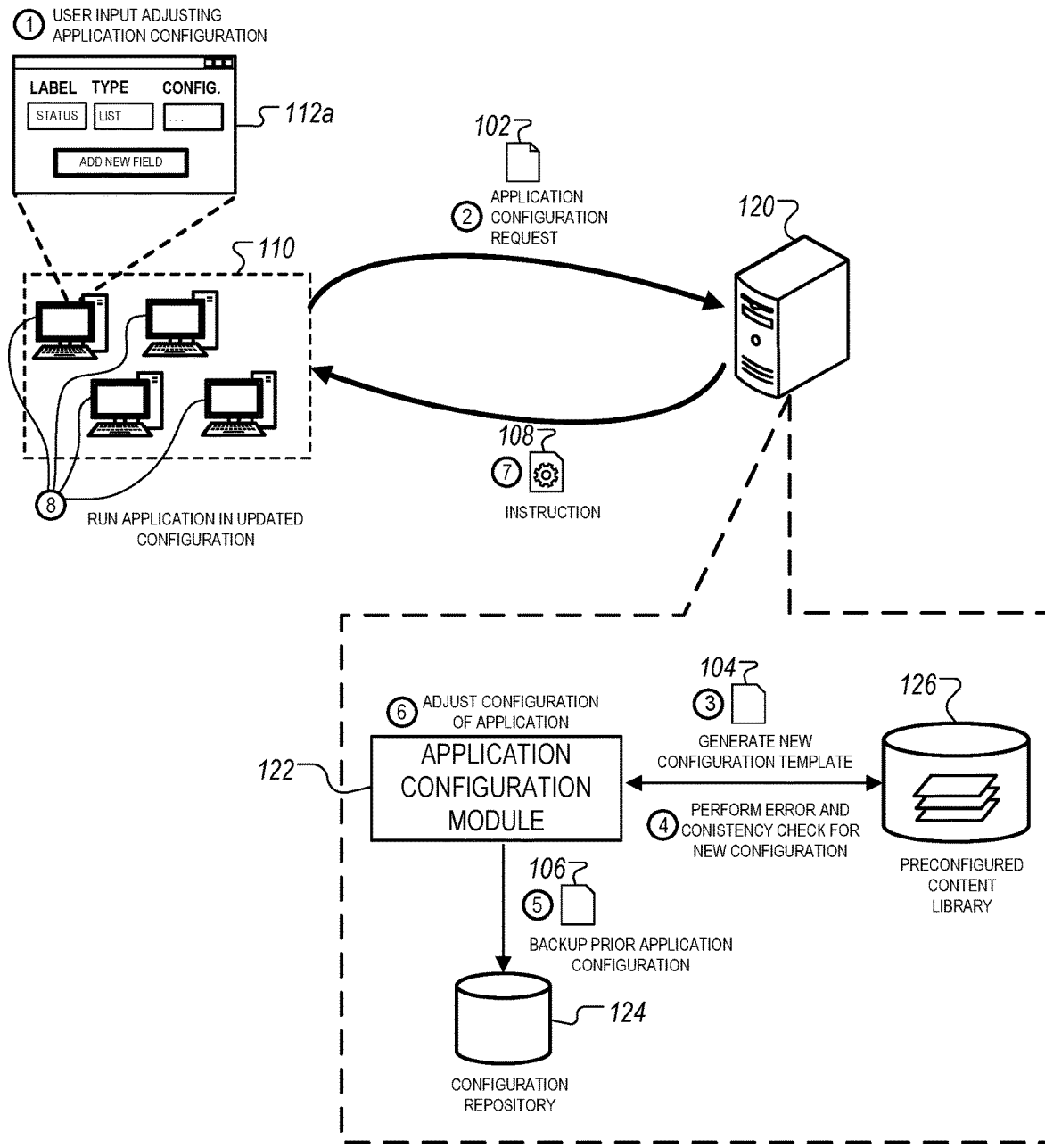
FIG. 1B is a block diagram that illustrates an example of a process for adjusting a configuration of an application while the application is running using the system depicted in FIG. 1A.

FIG. 1A is a block diagram that illustrates an example of a system 100 that is capable of generating dynamically configurable applications. In the example, the system 100 includes a client device 110A and a server 120 that exchange data communications over a network 105. Although a single client device is depicted in FIG. 1A, in some implementations, multiple client devices can be configured to run a single application based on exchanging communications with the application server 120 (as depicted in FIG. 1B). The client device 110A is associated with an end-user 101 that accesses an application running on the server 120. The end-user 101 can be a user with limited technical experience and/or training such as a business-related professional.

In general, the system 100 enables the end-user 101 to create, configure and/or adjust applications running on the server 120 without requiring the user to manually select the appropriate protocol to construct the application. During an exemplary application creation process, the end-user 101 accesses an application designer 112 on the client device 110A to provide configuration information for an application to be created. The user input received through the application designer 112 is transmitted to the server 120 over the network 105. An application configuration module 122 on the server 120 generates an application configuration based on accessing a configuration repository 124. The application configuration module 122 selects content to be included in the application from a content library 126. The application configuration module 122 generates a configuration template for the application and transmits the configuration template to the server 120. The server 120 configures the application based on the received application template, stores associated content, and configuration files in a corresponding application container 115. Once the application has been created on the server 120, the client device 110A enables the end-user to access the application on the client device 110A through the network 105. The end-user 101 can also dynamically adjust the configuration while the application is still running as depicted in FIG. 1B and described in detail below.

As described throughout, "accessing" an application refers to the display of an application on an electronic computing device that does not actually execute the application that is displayed. For example, the client device 110A "accesses" an application when the client device 110A provides a display of an instance of the application that runs on the server 120. The end-user of the client device 110A can interact with and/or manipulate user interface elements that are displayed while the client device 110A accesses the application. In this regard, an "active instance" of the application refers to an application running on the server 120 during which the client device 110A accesses the application, which results in the display of the application running on the server 120. As described in detail below, the system 100 is capable of adjusting the configuration of the application during an active instance such that the application configuration is updated while the client device 110A still accesses the application.

Referring now to the components of the system 100, the client device 110A can be any type of personal electronic computing device that is capable of accessing an application that runs on the server 120. For example, the client device 110A can be a smartphone, a tablet-computing device, a notebook-computing device, a wearable device, a desktop computing device, or any other type of network-enabled computing device.

The server 120 can be any type of application server configured to run, host, and/or support application services and other functionalities associated with applications that are accessed on the client device 110A. For example, the server 120 can provide application services related to application configuration protocols, security and slate maintenance, database access. The server 120 can also be capable of using different services, frameworks and/or platforms that enables applications to be hosted in suitable application environments of different devices. For example, the server 120 can use an ASP.NET model-view-control (MVC) framework, a Web API framework, among others. As described throughout, this capability of the server 120 flexibility in designing applications with various functions, capabilities, and/or runtime options on the client device 110A.

FIG. 1B is a block diagram that illustrates an example of a process for adjusting a configuration of an application while the application is running on a client device. The server 120, in this example, exchanges communications with multiple client devices 110 that each run instances of the application. For instance, the client devices 110 can be associated with a group of end-users that use the application for a specified business process such as tracking task completions for a common project. In other instances, the application can be used for other purposes as described throughout. In the example depicted, an end-user associated with one of the client devices 110 adjusts a configuration of the application while the application is being accessed on one or more of the other client devices. The adjustment, in this example, is therefore processed by the system 100 while the application is still being accessed in a production environment.

As depicted in FIG. 1B, the system 100 generally processes the adjustments to the application in several stages, which are represented in the figure as stages "(1)," "(2)," "(3)," "(4)," "(5)," "(6)," and "(7)." At stage (1), an end-user submits a user input through a configuration interface 112a of the application designer 112. The configuration interface 112a can be used to, for example, adjust names of data fields that are displayed on the application, create a new data field and/or a data association, adjust the configuration of existing data fields, among others. In some instances, the configuration interface 112a can provide similar options to an end-user as those depicted in FIGS. 2B-2E, which depict interfaces for creating a new application.

At stage (2), the client device transmits an application configuration request 102 to the server 120 over the network 105 (not shown). The application configuration request 102 identifies adjustments that were provided by the end-user 101 on the configuration interface 112a. For example, the application configuration request 102 identifies data fields that are to remain unchanged and data fields that are to be adjusted after the application has been adjusted according to the user input received on the configuration interface 112a.

At stage (3), the application configuration module 122 generates a new configuration template 104 for the application based on information included within the received application configuration request 102. For instance, if the application configuration request 102 indicates that a new data field is to be added to the application, the application configuration module 122 may identify content from the content library 126 that corresponds to the new data field. As an example, if a data field to be added references a specific collection of container objects, application templates, or other types of files, the application configuration module 122 may identify corresponding collection of content within the content library 126. In another instance, if the application configuration request 102 indicates that an existing data field is to be adjusted such that it references additional content, the application configuration module 122 may similarly identify content from the content library 126 that corresponds to the new content to be referenced.

At step (4), the application configuration module 122 performs error and consistency checks on the configuration template 104. In doing so, the application configuration module 122 verifies that adjusting the present configuration of the application using the configuration template 104 will not impair the existing operations of other components of the application and/or the operations of other applications or components that have dependencies with the components of the adjusted application (e.g., the adjustment is not logically incomplete to render components inoperative). The application configuration module 122 also determines whether any adjustments provided by the end-user are using components that were modified outside of an application ecosystem associated with the server 120 (e.g., modified versions of content that is included within the content library 126). As described in FIG. 4, if the application configuration module 122 determines that the user has provided an adjustment that involves an altered component, the end-user's account is disallowed from making any further changes to the application.

At step (5), the application configuration module 122 generates a backup 106 of the current configuration for the application that is to be adjusted. The back 106 is generated prior to adjusting the application using the configuration template 104 to enable the server 120 to revert back to the current configuration once the configuration template 104 has been implemented. The backup 106 can include all necessary application files (e.g., content, settings, executable files, etc.) that can be used to revert the configuration of the adjusted application.

The backup 106 can stored in a configuration repository 124 that stores multiple different configurations of the application at different time points after an initial configuration. For example, as depicted and discussed in detail with respect to FIG. 3, the configuration repository 124 can include the most recent prior configuration of the application. Each iteration can correspond to different adjustments provided by end-users such that the application can be reverted to the most recent iteration from a current configuration (e.g., reverting from a second iteration to a first iteration once a second iteration has been implemented, or reverting from a third iteration to the second iteration once the third iteration has been implemented).

At stage (6), the server 120 adjusts the configuration of the application using the configuration template 104. As described throughout, this adjustment is performed in a manner that preserves the existing structure and functionalities of the application prior to being updated and/or other already configured applications on the server 120 that have dependencies on the application after it has been updated. Additionally, the server 120 is capable of adjusting the application while one or more of the client devices 110 are accessing the application such that an update specified on the configuration interface 112a can be implemented during use of the application without requiring an end-user to exit or otherwise restart a running instance of the application.

At stage (7), the server 120 transmits an instruction 108 that enables the client devices 110 to access the application in its adjusted configuration according to the configuration template 104. The instruction 108 is provided in response to a request from a client device to access the application after it has been updated by the server 120 in stage (6). As an example, an end-user accesses the application on a client device in its initial configuration (e.g., prior the adjustment using the configuration template 104). While the application is being accessed, the server 120 adjusts the configuration of the application as described above. After the configuration adjustment is complete, the next request from the client device to the server 120 will result in the server 120 transmitting the instruction 108 to enable the client device to access the application in its adjusted configuration according to the configuration template 104.

At stage (8), the client devices 110 outputs a display of the application running in the configuration adjusted according to the configuration template 104. The client devices 110 are capable of accessing the application in its updated configuration without requiring an end-user to terminate an active instance of the application that was initiated on a client device prior to the start of the application adjustment in step (6).

Examples of different types of adjustments can be implemented using the configuration adjustment procedure described above. For instance, if the application configuration request 102 includes instructions specifying the creation and addition of a new data field to the application, the server 120 can update a stored application container 115 associated with the application to include additional content and configuration files associated with the new data field, which are invoked by the server 120 and from an associated data repository. In another example, if the application configuration request 102 specifies the removal of an existing data field, then applicable content and/or configuration files within the application container 115 that are associated with the data field to be removed can be temporarily disabled. In addition, any dependencies for these disabled components can be adjusted to prevent execution errors for other configured applications or other components of the application to be updated.

As described above, the server 120 is capable of updating the configuration of the application in real-time (e.g., at the time point shortly after the configuration template 104 has been generated) and during an active instance of the application (e.g., while the application is being accessed on one or more of the client devices 110). To accomplish this in a manner that does not substantially degrade an end-user's experience on the application, the server 120 temporarily runs a backup application while adjusting the configuration of the application using the configuration template 104. Thus, if an end-user adjusts a display of the application on the client device while the server 120 is adjusting the configuration of the application, the client device accesses a temporary backup configuration of the application until the adjustment process has been completed, after which the server 120 instructs the client device to display the adjusted application. In this example, the transition from the application that runs in the first configuration to the application that runs in the second configuration appears to be substantially imperceptible to an end-user as displayed on the client device.

FIG. 2A is a block diagram that illustrates an example of a process for creating a dynamically configurable application on the application designer 112. The end-user can use the application designer 112 on the client device 110A to create a new application and adjust the configuration of an already-configured application (such as the example described above in FIG. 2A). The descriptions that follow are provided in reference to application creation for simplicity. However, similar operations and/or procedures may be used by the system 100 when adjusting the configuration of an already-configured application according to user input submitted by an end-user.

In the example depicted in the figure, the application creation process includes an application definition phase 202, a form configuration phase 204, a collaboration configuration phase 206, and an application generation phase 208. FIG. 2A illustrates one example of an application creation process. In various other implementations, the system 100 may enable end-users to use different processes for creating different types of applications.

Figure 2B:
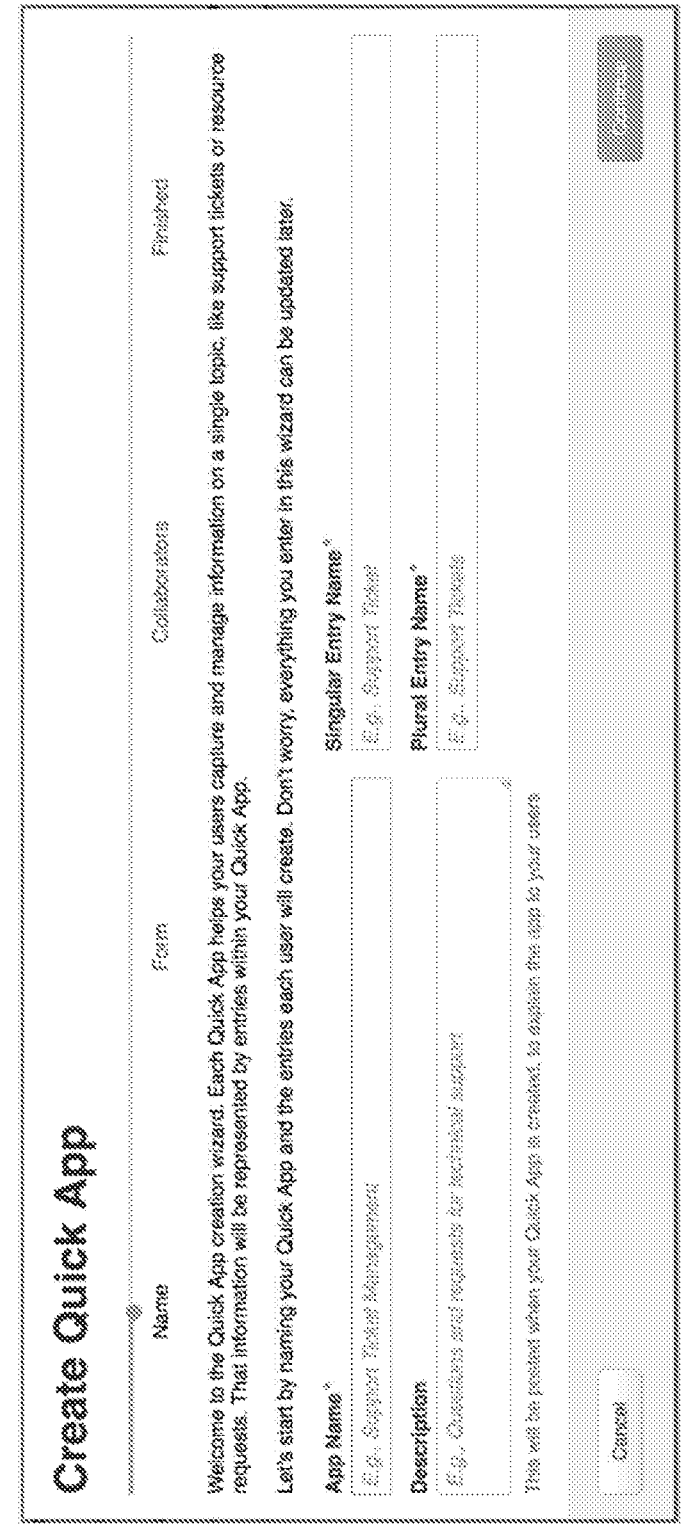
Figure 2C:
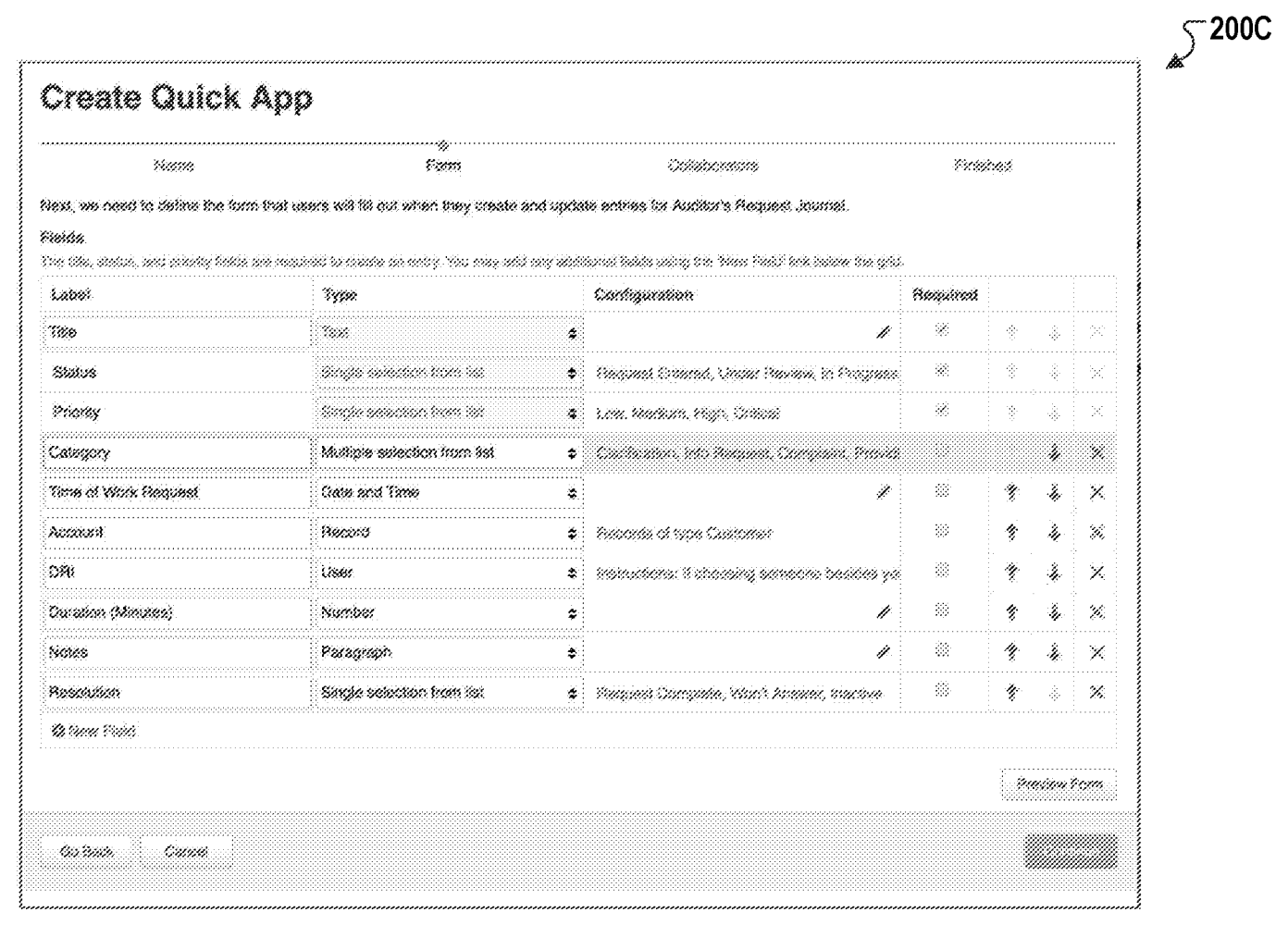
Figure 2D:
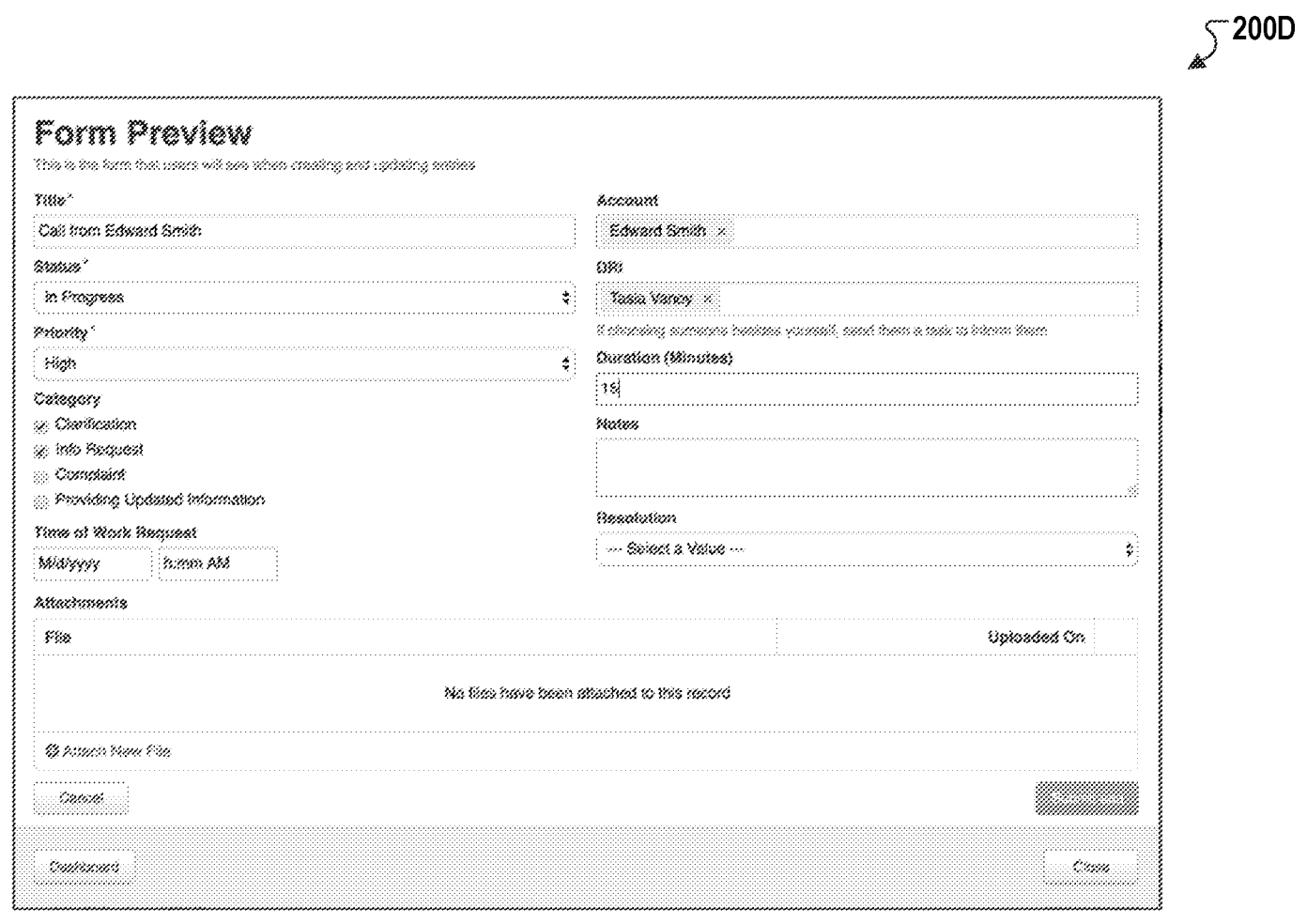
Figure 2E:
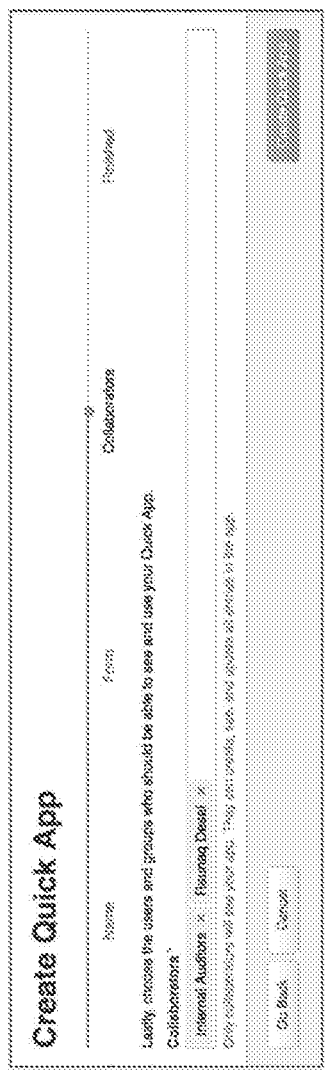

User interfaces that are presented to an end-user at each corresponding phase are depicted in FIGS. 2B-E. FIG. 2B illustrates an example of an interface 200B that is presented to the end-user at the application definition phase 202. FIGS. 2C-D illustrate examples of interfaces 200C and 200D that are presented to the end-user at the form configuration phase 204. FIG. 2E illustrates an example of an interface 200E that is presented to the end-user at the collaboration configuration phase 206.

Referring initially to FIG. 2B, an example of an interface 200B for naming an application to be created is depicted. The end-user is presented the interface 200B once he/she runs the application designer 112 and selects an option to create a new application. In some instances, if the end-user has already created other applications, he/she is directed to an interface that lists the previously configured applications. Once the end-user is directed to the interface 200B, he/she can provide input to provide an application name for the application to be created and a brief description of the application. The end-user can specify a single entry name and a plural entry name, which identify the application all database repositories associated with the system.

Referring now to FIG. 2C, an example of an interface 200C for configuring forms of an application to be created is depicted. The interface 200C allows the end-user to define, for example, different fields of a form that is presented to a user when using the application. In the example depicted, the end-user can customize fields of a form that is presented to any user when creating and/or updating record entries that are submitted through the application. As shown, examples of preconfigured fields include "Title," "Status," "Priority." The user can customize the configuration of these fields by specifying a field type, and adjusting a configuration associated with each field. For example, for the "Priority" field, which includes a list of prioritizations, the end-user can adjust the field configuration to add a new prioritization, remove an existing prioritization, or modify an existing prioritization.

The end-user can also use the interface 200C to create one or more entirely new customizable fields. For example, the customizable fields can include text fields (e.g., single-line entry), number fields (e.g., numeric entry of integer or decimal formats, etc.), paragraph fields (e.g., multi-line text entry), date and/or time fields, single or multiple selection list fields (e.g., of user-specified text option), among others. When specifying configurations each field, the end-user can specify, for example, field requirements (e.g., a required format for entry), instructional text to display below the field, an assistance tool to display next to the field label, and/or a placeholder text to display within the field. After specifying the fields to include in the form, and the configurations for each field, the end-user can preview the form as it would be displayed in a configured application.

Referring now to FIG. 2D, an example of an interface 200D for previewing a form of an application is depicted. As shown, the interface 200D presents a preview of the form that an end-user has recently configured while specifying options through the interface 200C. In the example depicted, the interface 200D provides a preview of an exemplary form that is used by users of a collaboration to submit records that pertain to project tasks. In other examples, forms can be used for other types of business processes such business operations, processes, among others. In addition, the end-user can view the form as it would appear in a generated application such that he/she may revert to the interface 200C to make any adjustments as needed.

Referring now to FIG. 2E, the interface 200E for specifying users that can view and access the application is depicted. The interface 200E allows an end-user to specify users and/or groups of users that can view or edit forms that are provided through the application. For example, individuals can be selected from a corporate directory of employees, personal contacts of the end-user creating the application, or contacts that are associated with an internal or external account of the end-user (e.g., a social media account, an email account, etc.). Once the end-user has selected that can view or edit the application, he/she can complete the application creation process by providing an input on the "Create Application" button.

Referring back to FIG. 2A, once the end-user has completed the front-end of the application creation process through the interfaces 200B-E (e.g., on the client device 110A), the application configuration module 122 generates a configuration template for the application to be created in the back-end (e.g., on the server 120) at the application generation phase 208. As discussed throughout, a "configuration template" can include data that is required to configure new application or adjust a configuration of an existing application. For example, the configuration template can include application content obtained from the content library 126 that is determined to be relevant to the configurations specified by the end-user, executable instructions for one or more client devices that will run the application, and/or any other necessary configuration files that are associated with the application. The application configuration module 122 packages the obtained content and files to generate the configuration template and transmits the configuration template to the server system 120 to view and modify the application to be created.

FIG. 3 is a block diagram that illustrates an example of a system 300 that is capable of reverting the configuration of an application to a prior configuration. In the example depicted, an application that runs on a client device 302 is modified twice to generate to three different versions of the application (e.g., versions 310A, 310B, and 310C). In this example, each version represents a distinct configuration of the same application. In some implementations, the system 300 is a component of the system 100 that is depicted in FIG. 1A. In such implementations, the application configuration module 122 can perform the reversions that are depicted in FIG. 3.

Each version is configured using a corresponding configuration template that is applied by the client device 302 in response to receiving a modification request submitted by an end-user through the applications designer 112. For example, version 310A of the application is initially constructed and configured using a configuration template 312A. In this example, the version 310A represents a newly created application, although in other applications, the version 310A can also represent a previously adjusted configuration that is generated prior to versions 310A and 3106. In addition, version 3106 of the application is constructed and configured using a configuration template 312B that is generated based on a first received modification request, whereas version 310C of the application is construction and configured using a second configuration template 312C is generated based on a second received modification request.

As shown in the figure, the system 300 is capable of generating and storing the templates 312A-C in a manner that supports reversion to the most recent version of the application. For example, the system 300 enables a reversion from version 310B to 310A when configuring the version 3106, and a reversion from version 310C to 3106 when configuring the version 310C. This is accomplished by storing application configurations in self-contained application containers 115 (described and depicted with respect to FIG. 1A). As described above, the contents of a stored application in the container 115 can be updated each time a current configuration of the application is updated based on user input provided by the end-user through the application designer 112. Prior versions of the application containers 115 can be remotely stored on the server 120 for use in a subsequent reversion to a corresponding application version.

Figure 4:
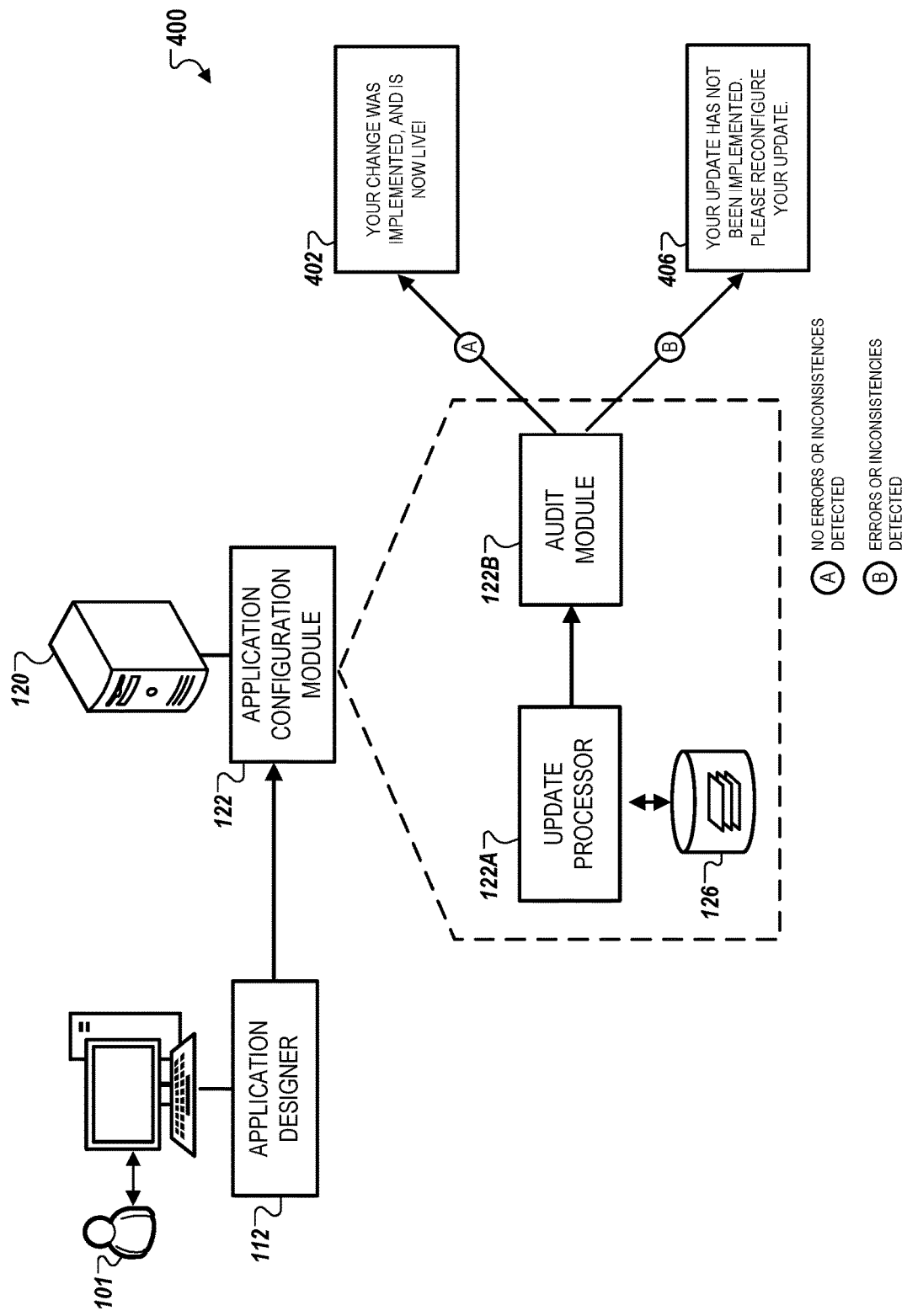
FIG. 4 is a block diagram that illustrates an example of a system that is capable of performing error and inconsistency checks for a configuration adjustment for an application.

FIG. 4 is a block diagram that illustrates an example of a system 400 that is capable of performing error and inconsistency checks for when adjusting a configuration of an application. Although the descriptions below are focused on adjustment of an application for simplicity, in some implementations, the operations depicted in FIG. 4 and described below can be performed for during or after application generation for a newly created application. In addition, in some implementations, the system 400 is a component of the system 100 depicted in FIG. 1A.

In the example depicted, an end-user 101 provides a request to adjust an application through the application designer 112 as described above with respect to FIG. 1B. The application configuration module 122 generates a new application configuration (e.g., the new application configuration 104 as depicted in FIG. 1B). During this process, an update processor 122A initially identifies content within the content library 126 that is determined to be relevant to adjustments provided by the end-user 101. For example, if the adjustment creates a new data field, then the update processor 122A identifies content (e.g., data files, data associations, object definitions, etc.) that is determined to be associated with the new data field and transmits a data package that specifies the identified content to the audit module 122B.

The audit module 122B performs a set of evaluation tests to ensure that the content to be used to adjust the configuration of an application does not limit or break application and system functionalities. The results of the evaluation tests can be used to indicate whether adjustments provided by the user will cause an execution error (e.g., logically incomplete data field definitions, inaccurate references to data objects) or if the adjustments are provided using components that have been adjusted outside of an application ecosystem associated with the system. As shown in the figure, the audit module 122B uses the results of the evaluation tests to either (1) prevent the end-user 101 from implementing an adjustment to the current configuration of the application if the results indicate that the adjustment would cause an execution error, or (2) disallow the end-user from making any further adjustments to the application if the results indicate that the user has used a modified version of an application component. Thus, the audit module 122B can be used as a protection framework that reduces any system vulnerabilities that may result from allowing the end-user to adjust the configuration of an application.

In the example depicted in the figure, the audit module 122B performs different actions based on the results obtained from performing the evaluation tests of new configuration, which are depicted in the figure as results "(A)" and "(B)." These exemplary results are provided for simplicity. In response to obtaining result (A), the audit module 122B outputs a notification 402 to the end-user 101 on the application designer 112 indicating that the update was successfully implemented and that the changes are now visible in the application runtime environment. In this example, the audit module 122B determines that the new configuration is both consistent with the existing functionalities of the application and any other application dependencies and performs consistently without potentially degrading a user's experience on the application.

In response to obtaining results (B), the audit module 122B outputs a notification 406 indicating that the update was not been implemented and instructs the end-user to reconfigure his/her adjustment through the application designer 112. In this example, the audit module 122B determines that the new configuration is consistent not consistent with existing functionalities of the application and any other application dependencies, and as a consequence, can potentially render essential application or system functions inoperable. In such circumstances, the audit module 122B disallows the end-user 101 from adjusting the application in a manner that would disrupt core application capabilities.

As described above, the system 400 provides a protection framework that prevents the end-user 101 from adjusting the configuration of an application to break existing system or application functionalities. This is accomplished using the audit module 122B to perform evaluation tests to determine an anticipated impact of a user-specified adjustment on the application to be adjusted and other applications that have dependencies on the application. In another example, if the user-specified adjustment changes an object definition, the audit module 122B may identify all instances of the object definition within an application framework and verify that these instances will not be impacted based on the change in the object definition.

Figure 5:
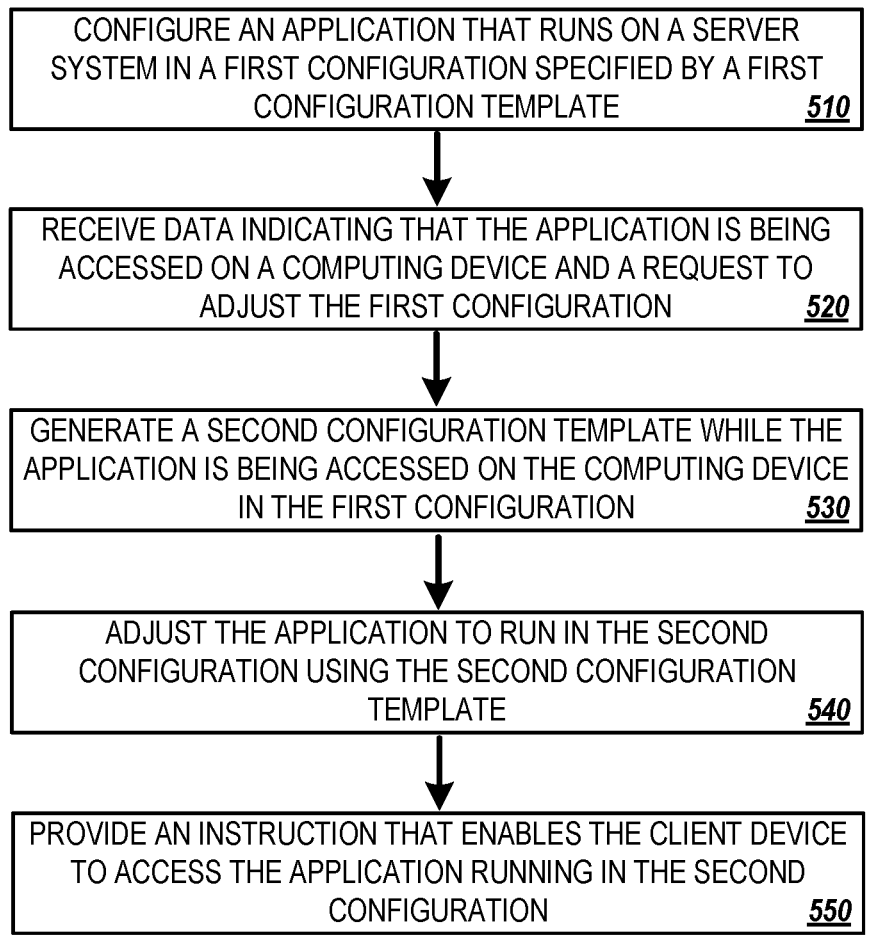
FIG. 5 is a flowchart that illustrates an example of a process for adjusting a configuration of an application while the application is running.

FIG. 5 is a flowchart that illustrates an example of a process 500 for adjusting a configuration of an application while the application is running. The operations of the process 500 can be performed by one or more components of the system 100A illustrated in FIG. 1A. For example, in some implementations, the operations are performed by the application configuration module 122 of the server 120.

Briefly, the process 500 can include the operations of configuring an application that runs on a server system in a first configuration specified by a first configuration template (510), receiving data indicating that the application is being accessed on a computing device and a request to adjust the first configuration (520), generating a second configuration template while the application is being accessed on the computing device in the first configuration (530), adjusting the application to run in the second configuration using the second configuration template (540), and providing an instruction that enables the client device to access the application running in the second configuration (550).

In more detail, the process 500 can include the operation of configuring an application that runs on a server system in a first configuration specified by a first configuration template (510). For example, the application configuration module 122 configures an application that runs on the server 120 using a first configuration template. The first configuration template can be generated, for example, when the end-user initially creates the application through the application designer 112 as depicted in FIGS. 2A-2E.

The process 500 can include the operation of receiving data indicating that the application is being accessed on a computing device and a request to adjust the first configuration (520). For example, the application configuration module 122 obtains the application configuration request 102 indicating that the end-user 101 has submitted a request to adjust the application through the configuration interface 112a. The application configuration module 122 additionally obtains data indicating that the application is actively being accessed on one or more of the client devices 110.

The process 500 can include the operation of generating a second configuration template while the application is being accessed on the computing device in the first configuration (530). For example, the application configuration module 122 generates a new configuration template 104 while the application is currently accessed on one or more of the client devices 110. As described above, the application configuration module 122 performs a set of evaluation tests. Results of the evaluation tests are used to determine whether the specifications provided by the configuration template 104 are compatible with existing functionalities of the application to be adjusted and other applications that have dependencies on the application to be adjusted (e.g., whether the configuration template 104 specifies logically incomplete data definitions).

The process 500 can include the operation of adjusting the application to run in the second configuration using the second configuration template (540). For example, the application configuration module 122 adjusts the application using the configuration template 104 such that, after the adjustment is complete, the application runs in a second configuration specified by the configuration template 104. If the application is being accessed by one or more of the client devices 110 while the server 120 performs the adjustment, the client devices are configured such that they access a temporary version of the application that runs while the adjustment takes place. The client devices are configured such that the disruptions to the user's experience during an active instance is minimized (e.g., limited latency in switching between application components while accessing the temporary application). As described above, the adjustment can be performed such that the end-user is not required to restart the application being accessed on the client device.

The process 500 includes the operation of providing an instruction that enables the client device to access the application running in the second configuration (550). For example, after adjusting the application to run in the second configuration, the server 120 provides the instruction 108 that enables the client devices 110 to access the application running in the second configuration.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
receiving, by a server system, data indicating (i) that an instance of an application running in a first configuration is being accessed on a computing device, and (ii) a request to adjust the first configuration;
configuring, by the server system, a backup application to run in the first configuration based on the request to adjust the first configuration;
providing, by the server system, a first instruction that enables the computing device to provide a representation of the interface based on the backup application; and
while the instance of the application running in the first configuration is being accessed on the computing device:
adjusting, by the server system, the application to run in a second configuration corresponding to the request to adjust the first configuration, and providing, by the server system and to the computing device, a second instruction that enables the computing device to access the application running in the second configuration.

2. The method of claim 1, further comprising storing, by the server system, backup data associated with the application running in the first configuration.

3. The method of claim 2, further comprising:
after adjusting the application to run in the second configuration, determining, by the server system, to revert the application to run in the first configuration;
generating, by the server system, a first configuration template based at least on the backup data associated with the application running in the first configuration; and
adjusting, by the server system and using the first configuration template, the application to run in the first configuration.

4. The method of claim 1, wherein:
the data indicating the request to adjust the first configuration comprises a data type adjustment for a data field of the application; and
adjusting the application to run in the second configuration comprises:
identifying, by the server system, one or more database objects that are determined to have data dependencies to the data field of the application, and
adjusting, by the server system, a configuration of the one or more database objects according to the request to adjust the first configuration.

5. The method of claim 1, further comprising, before adjusting the application to run in the second configuration:
executing, by the server system, one or more evaluation tests associated with a second configuration template used to adjust the application to run in the second configuration; and
determining to adjust the application based on results of the one or more evaluation tests.

6. The method of claim 5, wherein the results of the one or more evaluation tests indicate that adjusting the application using the second configuration template will not cause one or more execution errors.

7. The method of claim 5, wherein the results of the one or more evaluation tests indicate that the request to adjust the first configuration is not associated with one or more modified application components.

8. A system comprising:
one or more computing devices; and
one or more storage devices storing instructions that, when executable by the one or more computing devices, cause the one or more computing devices to perform operations comprising:
receiving, by a server system, data indicating (i) that an instance of an application running in a first configuration is being accessed on a computing device, and (ii) a request to adjust the first configuration;
configuring, by the server system, a backup application to run in the first configuration based on the request to adjust the first configuration;
providing, by the server system, a first instruction that enables the computing device to provide a representation of the interface based on the backup application; and
while the instance of the application running in the first configuration is being accessed on the computing device:

adjusting, by the server system, the application to run in a second configuration corresponding to the request to adjust the first configuration, and
providing, by the server system and to the computing device, a second instruction that enables the computing device to access the application running in the second configuration.

9. The system of claim 8, wherein the operations further comprise storing, by the server system, backup data associated with the application running in the first configuration.

10. The system of claim 9, wherein the operations further comprise:
after adjusting the application to run in the second configuration, determining, by the server system, to revert the application to run in the first configuration;
generating, by the server system, a first configuration template based at least on the backup data associated with the application running in the first configuration; and
adjusting, by the server system and using the first configuration template, the application to run in the first configuration.

11. The system of claim 8, wherein:
the data indicating the request to adjust the first configuration comprises a data type adjustment for a data field of the application; and
adjusting the application to run in the second configuration comprises:
identifying, by the server system, one or more database objects that are determined to have data dependencies to the data field of the application, and
adjusting, by the server system, a configuration of the one or more database objects according to the request to adjust the first configuration.

12. The system of claim 8, wherein the operations further comprise, before adjusting the application to run in the second configuration:
executing, by the server system, one or more evaluation tests associated with a second configuration template used to adjust the application to run in the second configuration; and
determining to adjust the application based on results of the one or more evaluation tests.

13. The system of claim 12, wherein the results of the one or more evaluation tests indicate that adjusting the application using the second configuration template will not cause one or more execution errors.

14. The system of claim 12, wherein the results of the one or more evaluation tests indicate that the request to adjust the first configuration is not associated with one or more modified application components.

15. At least one non-transitory computer-readable storage device storing instructions that, when executable by one or more processors, cause the one or more processors to perform operations comprising:
receiving, by a server system, data indicating (i) that an instance of an application running in a first configuration is being accessed on a computing device, and (ii) a request to adjust the first configuration;
configuring, by the server system, a backup application to run in the first configuration based on the request to adjust the first configuration;
providing, by the server system, a first instruction that enables the computing device to provide a representation of the interface based on the backup application; and while the instance of the application running in the first configuration is being accessed on the computing device:
adjusting, by the server system, the application to run in a second configuration corresponding to the request to adjust the first configuration, and
providing, by the server system and to the computing device, a second instruction that enables the computing device to access the application running in the second configuration.

16. The device of claim 15, wherein the operations further comprise storing, by the server system, backup data associated with the application running in the first configuration.

17. The device of claim 16, wherein the operations further comprise:
after adjusting the application to run in the second configuration, determining, by the server system, to revert the application to run in the first configuration;
generating, by the server system, a first configuration template based at least on the backup data associated with the application running in the first configuration; and
adjusting, by the server system and using the first configuration template, the application to run in the first configuration.

18. The device of claim 15, wherein:
the data indicating the request to adjust the first configuration comprises a data type adjustment for a data field of the application; and
adjusting the application to run in the second configuration comprises:
identifying, by the server system, one or more database objects that are determined to have data dependencies to the data field of the application, and
adjusting, by the server system, a configuration of the one or more database objects according to the request to adjust the first configuration.

19. The device of claim 15, wherein the operations further comprise, before adjusting the application to run in the second configuration:
executing, by the server system, one or more evaluation tests associated with a second configuration template used to adjust the application to run in the second configuration; and
determining to adjust the application based on results of the one or more evaluation tests.

20. The device of claim 19, wherein the results of the one or more evaluation tests indicate that adjusting the application using the second configuration template will not cause one or more execution errors.

* * * * *